United States Patent
Swieter et al.

(10) Patent No.: US 10,967,902 B2
(45) Date of Patent: Apr. 6, 2021

(54) METHOD FOR CALIBRATING THE STEERING ANGLE SENSOR OF A MOTOR VEHICLE

(71) Applicant: VOLKSWAGEN AG, Wolfsburg (DE)

(72) Inventors: Ingo Swieter, Cremlingen (DE); Luis Alberto Cisterna, Braunschweig (DE)

(73) Assignee: VOLKSWAGEN AG

(*) Notice: Subject to any disclaimer, the term of this patent is extended or adjusted under 35 U.S.C. 154(b) by 57 days.

(21) Appl. No.: 15/974,159

(22) Filed: May 8, 2018

(65) Prior Publication Data
US 2018/0319425 A1 Nov. 8, 2018

(30) Foreign Application Priority Data
May 8, 2017 (DE) ..................... 10 2017 207 751.4

(51) Int. Cl.
*G06F 7/00* (2006.01)
*B62D 15/00* (2006.01)
(Continued)

(52) U.S. Cl.
CPC ......... *B62D 5/0475* (2013.01); *B62D 15/021* (2013.01); *B62D 15/0235* (2013.01)

(58) Field of Classification Search
None
See application file for complete search history.

(56) References Cited

U.S. PATENT DOCUMENTS 5,465,210 A * 11/1995 Walenty ............. B62D 15/0235
180/412
7,034,483 B2 * 4/2006 Takahashi ............. B62D 5/006
318/139
(Continued)

FOREIGN PATENT DOCUMENTS

DE  10211426 A1  10/2003
DE  10225975 A1  1/2004
(Continued)

OTHER PUBLICATIONS

Search Report for German Patent Application No. 10 2017 207 751.4; dated Jan. 25, 2018.
(Continued)

*Primary Examiner* — Adam D Tissot
*Assistant Examiner* — Laura E Linhardt
(74) *Attorney, Agent, or Firm* — Barnes & Thornburg, LLP

(57) ABSTRACT

A method and equipment for calibrating the steering angle sensor system of an electric steering system of a transportation vehicle during a software update, wherein the steering angle sensor system has a rotor position sensor for determining the rotor position of the electric motor of the electric steering system and the steering angle is derived from the rotor position. The method includes starting the software update, reading in and saving the present position data of the electric motor of the steering system, reading in and saving the memory values of the present calibration of the steering angle sensor system, cyclically monitoring the rotor position of the electric motor using the rotor position sensor, performing the software update, terminating the software update, and writing back the memory values of the calibration and releasing the software update.

10 Claims, 1 Drawing Sheet

(51) Int. Cl.
B62D 15/02 (2006.01)
B62D 5/04 (2006.01)

(56) References Cited

U.S. PATENT DOCUMENTS

| | | |
|---|---|---|
| 2003/0040855 A1* | 2/2003 | Pattok ................ B62D 15/0245 |
| | | 701/32.3 |
| 2003/0094329 A1 | 5/2003 | Ogawa et al. |
| 2004/0117087 A1 | 6/2004 | Dilger |
| 2005/0017664 A1 | 1/2005 | Takahashi et al. |
| 2006/0293818 A1 | 12/2006 | Lu et al. |
| 2008/0282788 A1 | 11/2008 | Pattok et al. |

FOREIGN PATENT DOCUMENTS

| | | |
|---|---|---|
| DE | 102005033866 A1 | 1/2007 |
| DE | 102012012386 A1 | 12/2013 |
| DE | 102012022869 A1 | 5/2014 |
| DE | 102014118910 A1 | 7/2015 |
| DE | 102014119366 A1 | 7/2015 |
| DE | 102015207333 A1 | 10/2016 |
| DE | 102015013965 A1 | 5/2017 |
| EP | 1772349 A2 | 4/2007 |
| EP | 1992549 A2 | 11/2008 |
| KR | 20080105527 A * | 12/2008 |
| KR | 20080105527 A | 12/2008 |

OTHER PUBLICATIONS

Office Action and Search Report for Chinese Patent Application No. 201810430802.4; dated May 28, 2020.

* cited by examiner

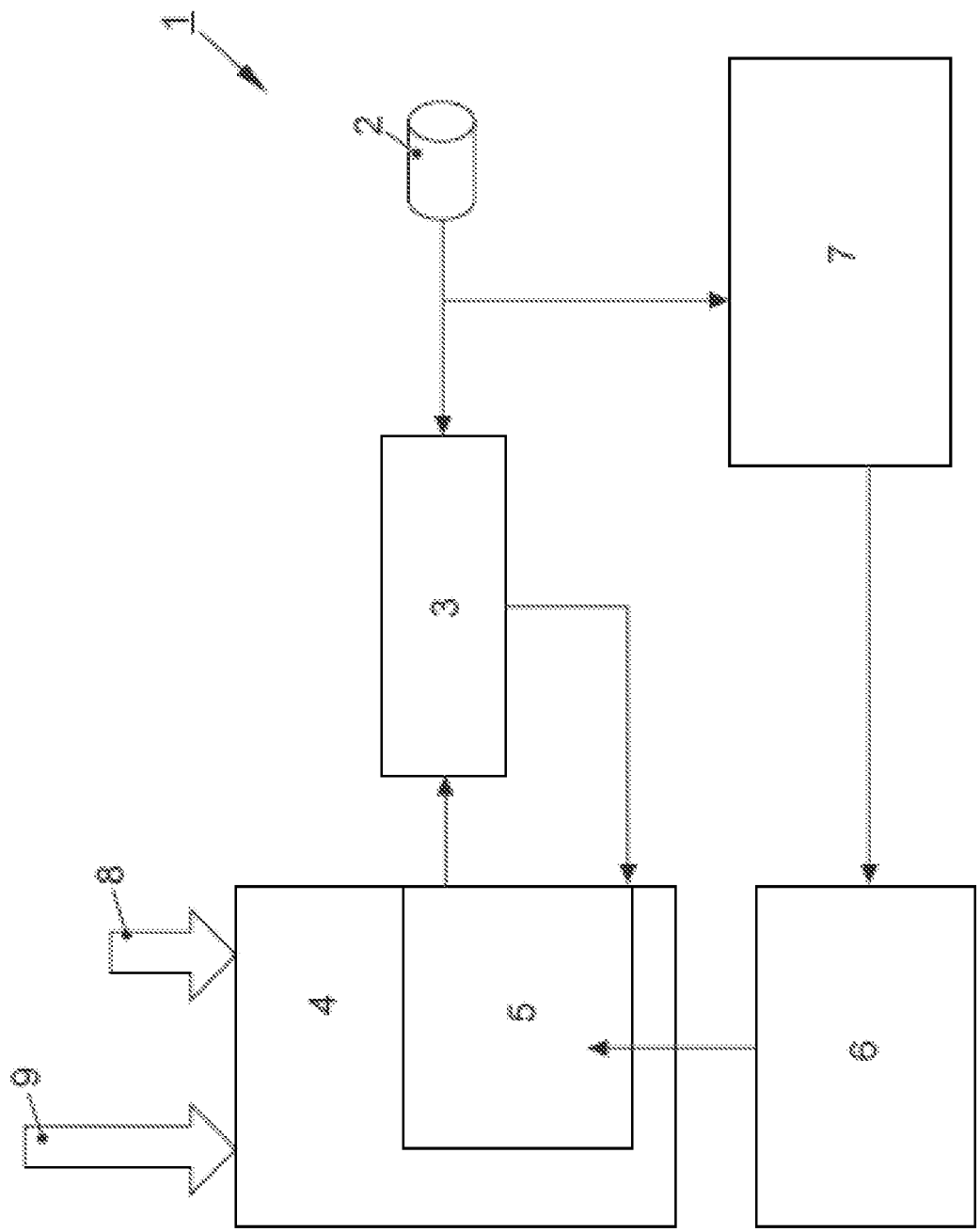

METHOD FOR CALIBRATING THE STEERING ANGLE SENSOR OF A MOTOR VEHICLE

PRIORITY CLAIM

This patent application claims priority to German Patent Application No. 10 2017 207 751.4, filed 8 May 2017, the disclosure of which is incorporated herein by reference in its entirety.

SUMMARY

Illustrative embodiments relate to a method for calibrating the steering angle sensor system of a steering system of a motorized transportation vehicle during a software update.

BRIEF DESCRIPTION OF THE DRAWINGS

The disclosed embodiments are explained below with reference to the drawing, in which FIG. 1 shows a block diagram of the method for calibrating a steering angle sensor system after an SW update.

DETAILED DESCRIPTION

The present status of steering angle calibration in an electric steering system is that the steering angle is computed from the rotor position of the electric motor of the electric steering, the information about the rotor position not being absolute. In other words, the rotor position must always be referenced to the zero position of the steering column externally and the value of the rotor position vis à vis the zero position is stored in volatile state. If the ECU is now isolated from the supply or the software is stored anew, then the steering angle needs to be recalibrated or reinitialized, as described above. Usually, the referencing to the zero position of the steering column is effected using diagnosis tools in the producing factory and is effected when the transportation vehicle is first started up at the end of the production line.

Thus, the steering angle sensor system of an electric steering system of a motorized transportation vehicle needs to be recalibrated after every software update, subsequently referred to as an SW update for short, the calibration being effected mechanically. For this purpose, after every software update, calibration requires the steering wheel to be operated to run through the entire gear rack travel of the steering. Subsequently, the ODIS interface needs to be used to execute appropriate calibration commands. This present implementation of the steering angle functionality does not allow an automatic SW update during a customer appointment on account of the complexity. To ensure the integrity of the data, the learning process during an SW update is always performed. A change in the steering wheel and hence also the gear rack would result in corruption of the data and hence in an incorrect steering angle.

The document DE 10 2015 207 333 A1 describes a method and an apparatus for generating the steering angle of an electric steering of a transportation vehicle, in which the present steering angle is determined at the input shaft by virtue of the steering angle equivalent of the motor position sensor having a correction angle added. In this case, the electric steering has an input shaft, a steering torque sensor arranged on the input shaft, a gear rack, an electric motor acting on the gear rack and a motor position sensor, with a steering angle equivalent being derived from the signals of the motor position sensor.

The document DE 10 2012 022 869 A1 relates to a steering angle sensor by which an angle of a steering column is determined, wherein the steering column has a first shaft section and a second shaft section that are rotatable relative to one another, wherein the steering angle sensor has two magnetic code tracks from whose angle information the angle of the steering column, in particular, the angle of the first shaft section, is inferred, one magnetic code track of the steering angle sensor being formed by a first multipole magnetic ring of a torque sensor that is connected to the first shaft section and that has an assigned magnetic field sensor.

The document DE 10 2012 012 386 A1 relates to a method for determining the mechanical limit stops between an input shaft and an output shaft of a steering system, which are rotationally elastically connected via a torsion element, by an input shaft, an output shaft, a torsion element, a torque sensor, a steering angle sensor, an evaluation unit, a servomotor, an angle sensor, a gearbox and a gear rack, wherein the data of the torque sensor are used to determine a torque and, depending on the torque, the servomotor applies an assistance torque to the gear rack, wherein the angle sensor ascertains an angle profile of the output shaft or an angle profile coupled to the angle profile of the output shaft, wherein the angle profile of the angle sensor is compared with the angle profile of the steering angle sensor, wherein a change in the angular velocity of the steering angle sensor results in the angular velocity of the angle sensor being ascertained, wherein the minimum or maximum stop angle stipulated is the angle at the torque sensor for which the difference between the angular velocities of the steering angle sensor and the angle sensor is less than/equal to a threshold value.

Disclosed embodiments provide a method that simplifies the calibration of the steering angle sensor system of the steering system of a motorized transportation vehicle during a software update.

The disclosed method for calibrating the steering angle sensor system of an electric steering system of a motorized transportation vehicle during a software update, wherein the steering angle sensor system has a rotor position sensor for determining the rotor position of the electric motor of the electric steering system, and wherein the steering angle is derived from the rotor position, comprises:

starting the software update,
reading in and saving the present position data of the electric motor of the steering system,
reading in and saving the memory values of the present calibration of the steering angle sensor system,
cyclically monitoring the rotor position of the electric motor using the rotor position sensor,
performing the software update,
terminating the software update if the rotor position sensor detects a movement by the rotor of the electric motor, and
writing back the memory values of the calibration and releasing the software update if no movement by the rotor has been detected.

Optionally, the memory values of the calibration comprise at least the SW limit stop positions, the steering center, index positions and the straight-ahead correction. In other words, during a successful software update, the calibration values buffer-stored on software update are written back again and reused.

Optionally, in the event of termination of the software update, the electric steering system is available for a repeat of the software update.

Optionally, to prevent the movement by the rotor of the electric motor the steering column lock is latched after the software update is started.

Optionally, in the event of termination of the software update on account of a detected movement by the rotor the rotor position sensor generates an error message and the termination is communicated centrally on the transportation vehicle bus.

The method outlined above allows the software of the steering angle sensor system to be updated without the need for mechanical recalibration to be performed.

FIG. 1 shows a schematic depiction of the procedure for the steering angle sensor system 1 of an electric steering system during a software update as a block diagram. The rotor position sensor 2 of the electric drive (not depicted) of the electric steering delivers measurement signals to a system ASIC 3, i.e., an application-specific integrated circuit, which converts the signals of the rotor position sensor 2 into a piece of angle information that the main controller 4 of the control unit 1 can process and supplies the information to the evaluation device 5, located in the main controller 4, of the system ASIC 3. In the event of a software update, a device 6 for monitoring a software update firstly uses the evaluation device 5 of the system ASIC 3 to continuously monitor the rotor position sensor 2. Further, a monitoring device 7 is used to directly monitor the rotor position sensor 2, and if the rotor of the electric drive has moved, this information is supplied to the monitoring device 6 responsible for the software update. In the event of direct detection of a movement by the rotor 2, the monitoring device 6 terminates the software update, which is supplied to the main controller 4 via the transportation vehicle bus connection 8. Further, power is supplied to the main controller 4 by the onboard electrical system of the transportation vehicle via an appropriate connection 9.

LIST OF REFERENCE SYMBOLS

1 Steering angle sensor system
2 Rotor position sensor
3 System ASIC
4 Main controller
5 Evaluation of the system ASIC
6 Monitoring of the software update
7 Rotor position sensor monitoring
8 Onboard electrical system connection
9 Transportation vehicle bus

The invention claimed is:

1. A method for calibrating the steering angle sensor system of an electric steering system of a motorized transportation vehicle during a software update, wherein the steering angle sensor system has a rotor position sensor for determining a rotor position of a rotor of an electric motor of the electric steering system, and wherein a steering angle is derived from the rotor position, the method comprising:
   starting the software update;
   reading in and saving present position data of the electric motor of the electric steering system;
   reading in and saving memory values of a present calibration of the steering angle sensor system;
   cyclically monitoring, by a first monitoring device of the steering angle sensor system, supplied information indicative of the rotor position of the electric motor using the rotor position sensor;
   in response to the rotor position sensor detecting a movement by the rotor of the electric motor during performance of the software update, supplying, by a second monitoring device of the steering angle sensor system to the first monitoring device, information indicating the detected movement and preventing supplying the information in response to no movement by the rotor being detected during performance of the software update;
   in response to receiving the supplied information, terminating, by the first monitoring device, the software update by transmitting the termination to a main controller of the transportation vehicle; and
   writing back the memory values of the present calibration and releasing the software update in response to no movement by the rotor being detected.

2. The method of claim 1, wherein the memory values of the present calibration comprise at least software limit stop positions, a steering center, index positions, and a straight-ahead correction.

3. The method of claim 1, wherein the electric steering system is configured to repeat the software update in response to the termination of the software update.

4. The method of claim 1, wherein a steering column lock is latched after the software update is started to prevent the movement by the rotor of the electric motor.

5. The method of claim 1, wherein the rotor position sensor generates an error message in response to the termination of the software update on account of a detected movement by the rotor.

6. Equipment for calibrating a steering angle sensor system of an electric steering system of a motorized transportation vehicle during a software update, wherein the steering angle sensor system has a rotor position sensor for determining a rotor position of a rotor of an electric motor of the electric steering system, wherein the steering angle sensor system has a first monitoring device to monitor the software update, wherein the steering angle sensor system has a second monitoring device to detect movement in the rotor, wherein a steering angle is derived from the rotor position, wherein, following start of the software update, a present position data of the electric motor of the steering system is read in and saved along with memory values of a present calibration of the steering angle sensor system, the equipment comprising:
   a first monitoring device to cyclically monitor, during the performance of the software update, supplied information indicating a movement in the rotor position of the electric motor detected using the rotor position sensor;
   a second monitoring device to, in response to data from the rotor position sensor indicating a movement by the rotor of the electric motor, supply to the first monitoring device information indicating the detected movement and to prevent supplying to the first monitoring device the information when no movement by the rotor has been detected, wherein the first monitoring device is further configured to terminate the software update, in response to the supplied information indicating a movement of the rotor position sensor, by transmitting the termination to a main controller of the motorized transportation vehicle; and
   circuitry to write back the memory values of the present calibration and release the software update in response to no movement by the rotor being detected.

7. The equipment of claim 6, wherein the memory values of the present calibration comprise at least software limit stop positions, a steering center, index positions, and a straight-ahead correction.

8. The equipment of claim 6, wherein the electric steering system configured to repeat the software update in response to termination of the software update.

9. The equipment of claim 6, wherein a steering column lock is latched after the software update is started to prevent the movement by the rotor of the electric motor.

10. The equipment of claim 6, wherein the rotor position sensor generates an error message in response to the termination of the software update on account of a detected movement by the rotor.

* * * * *